United States Patent [19]

Chambers et al.

[11] Patent Number: 5,626,410
[45] Date of Patent: May 6, 1997

[54] REAR PROJECTION SCREEN WITH UNIFORM BRIGHTNESS FOR TILING THE IMAGES FROM AN ARRAY OF PROJECTORS

[75] Inventors: James M. Chambers, Carlsbad; Steven E. Shields, San Diego, both of Calif.

[73] Assignee: Palomar Technologies Corporation, Carlsbad, Calif.

[21] Appl. No.: 530,856

[22] Filed: Sep. 20, 1995

[51] Int. Cl.$^6$ .................................................. G03B 21/14
[52] U.S. Cl. ............................... 353/94; 353/30; 359/456
[58] Field of Search ............................. 353/30, 38, 94, 353/122; 359/40, 42, 443, 452, 453, 456, 599

[56] References Cited

U.S. PATENT DOCUMENTS

| | | | |
|---|---|---|---|
| 4,960,314 | 10/1990 | Smith et al. | 359/443 |
| 5,196,960 | 3/1993 | Matsuzaki et al. | 359/453 |
| 5,457,572 | 10/1995 | Ishii et al. | 359/452 |

OTHER PUBLICATIONS

B. Bahadur, *Liquid Crystals: Applications and Uses*, vol. 1, World Scientific Publishing (1990), pp. 397–436.

*Primary Examiner*—William Dowling
*Attorney, Agent, or Firm*—Rodney F. Brown

[57] ABSTRACT

A novel rear projection screen that displays images with substantially uniform brightness over a wider field-of-view than prior rear projection screens, comprising a first diffusing assembly for diffusing the image and a second diffusing assembly for further diffusing the image from the first diffuser. In the preferred embodiment, the first and second diffusing assemblies comprise an input diffusing screen and a fiber optic array, respectively, with an output diffusing screen used at the output end of the fiber optic array. A preferred flat panel tiled display system that incorporates the present invention includes a plurality of collimated light sources, with respective liquid crystal display assemblies that impart images onto the collimated light beams. An imager images the image-bearing light beams onto the rear projection screen described above so that they are displayed in a tiled arrangement.

16 Claims, 4 Drawing Sheets

REAR PROJECTION SCREEN WITH UNIFORM BRIGHTNESS FOR TILING THE IMAGES FROM AN ARRAY OF PROJECTORS

CROSS-REFERENCE TO RELATED APPLICATIONS

The present application is related to the following U.S. patent applications that are assigned to Hughes Aircraft Company, the assignee of the present invention:

(1) Ser. No. 08/040,648 filed on Mar. 31, 1993, entitled "FLAT PANEL DISPLAY USING REAR PROJECTION SCREEN" by Randall D. Blanchard.

(2) Ser. No. 08/319,342 filed Oct. 6, 1994, entitled "REAR PROJECTION SCREEN WITH HIGH OFF-AXIS SUNLIGHT REJECTION" by Randall D. Blanchard, a continuation of U.S. patent application Ser. No. 08/040,417 filed Mar. 31, 1993.

BACKGROUND OF THE INVENTION

1. Field of the Invention

This invention relates to projection systems which "tile" multiple projector images on a rear projection screen, and more particularly to such a system employing a rear projection screen with improved brightness uniformity.

2. Description of the Related Art

Flat panel displays are commonly employed in lap-top, notebook or other portable computers in which packaging dimensions are of critical importance. In such applications, it is particularly important to keep the thickness of the display system to a minimum.

In prior display systems, minimum display thickness is obtained by employing a flat, minimum illumination source. The illumination source often comprises a flat fluorescent light system and a contiguous diffuser that are positioned adjacent to the rear surface of an active matrix liquid crystal module. The diffuser is utilized in an attempt to distribute light from the fluorescent source evenly over the liquid crystal module. In viewing the displayed image, the viewer effectively looks through the liquid crystal module at the diffused light source behind it.

With this method, it is very difficult to provide uniformity of brightness over a large surface area of the display. Further, because the viewer is effectively looking through the liquid crystal display at the diffuse light source behind it, light rays that pass through the liquid crystal display at an angle will traverse a longer path through the liquid crystal material than those that pass through at a normal to the display surface. This results in image contrast degradation.

The display system described in related U.S. application Ser. No. 08/040,648 avoids these problems by using a collimated light source to illuminate a liquid crystal light valve (LCLV) and a rear projection diffusing screen in front of the LCLV to diffuse the light and control the field-of-view of the display system. The use of collimated light to illuminate the LCLV avoids the contrast problems discussed above. However, the display thickness must be at least as great as the projection screen width due to the need to collimate the illumination light before it reaches the LCLV. This limits the applicability of the display system to flat panel displays with relatively small screen sizes.

One way of overcoming this screen size limitation is to display the image as a set of individual smaller image portions that are displayed side-by-side in an array fashion on the rear projection screen. Each of the smaller image portions is created with separate small image sources, such as LCLVs. This technique, known as "tiling", allows one to create a display system with an arbitrarily large screen size, while still employing a number of relatively small image sources. The problem with tiled systems is non-uniformity in brightness between the adjacent image portions on the projection screen when viewed either on or off-axis. This is because the brightness of an image that is diffused from a rear projection screen varies as a function of both the angle of incidence that the image makes with respect to the projection screen, and the angle at which the observer views the image on the projection screen. Since each of the tiled images is incident on the screen at a different angle, and since an observer views each of them at a different viewing angle, the observer will perceive brightness differences between them.

SUMMARY OF THE INVENTION

In view of the above problems, the present invention provides a novel rear projection screen that displays images with substantially uniform brightness over a wider field-of-view than prior rear projection screens. The projection screen comprises a first diffusing assembly for diffusing the image and a second diffusing assembly for further diffusing the image from the first diffuser.

In the preferred embodiment, the first and second diffusing assemblies comprise an input diffusing screen and a fiber optic array, respectively, with an output diffusing screen used at the output end of the fiber optic array. The input diffusing screen scatters each light ray from the image into a set of scattered light rays. Some of the scattered light rays are captured by the fiber optic array, where they undergo multiple reflections. Each scattered light ray is reflected a different number of times inside the fiber optic array, so that they exit the fiber with propagation directions that are substantially randomized. The output diffusing screen further scatters each scattered light ray after it has exited the fiber optic array, to produce an image with more uniform brightness over a larger field-of view than can be achieved with rear projection screens that utilize only one diffusing screen.

A preferred flat panel tiled display system that incorporates the present invention includes a plurality of collimated light sources, with respective liquid crystal display assemblies that impart images onto the collimated light beams. An imager images the image-bearing light beams onto the rear projection screen described above so that they are displayed in a tiled arrangement.

These and other features and advantages of the invention will be apparent to those skilled in the art from the following detailed description of preferred embodiments, taken together with the accompanying drawings, in which:

DETAILED DESCRIPTION OF THE INVENTION

Figure 1:
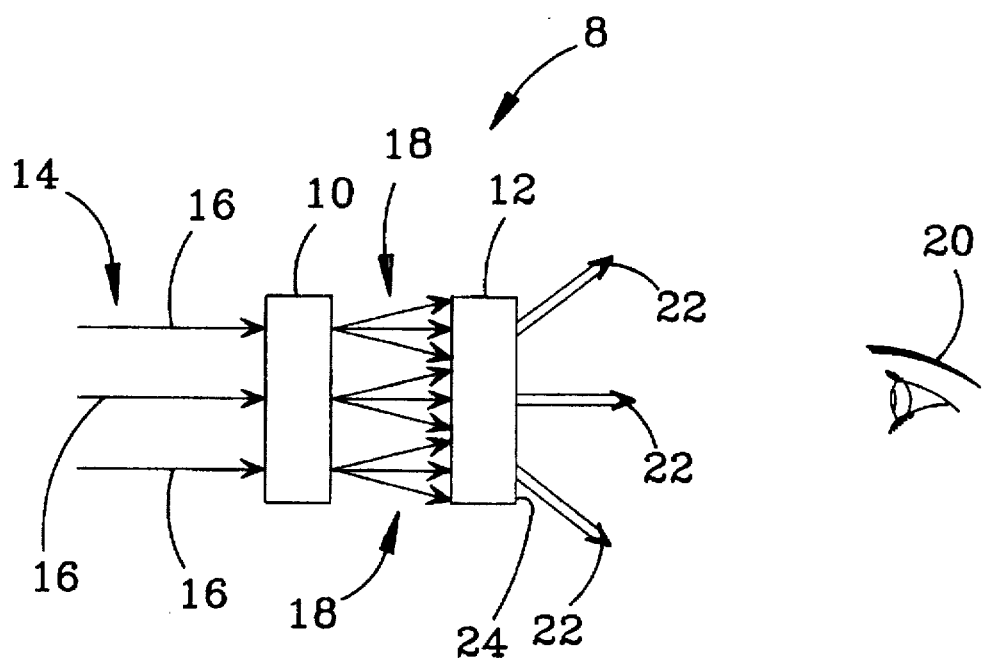
FIG. 1 is a block diagram illustrating the basic principles of the invention.

FIG. 1 illustrates the basic principles of the invention. The rear projection screen 8 comprises a first diffusing assembly 10 and a second diffusing assembly 12. In operation, the first diffusing assembly 10 receives an incoming image 14 from an image source (not shown). Each image light ray 16 is scattered by the first diffusing assembly 10 into a set of scattered light rays 18. The second diffusing assembly 12 further scatters the scattered light rays 18. An observer 20 views the final image 22 by looking towards the outer surface 24 of the second diffusing assembly 12.

Figure 2A:
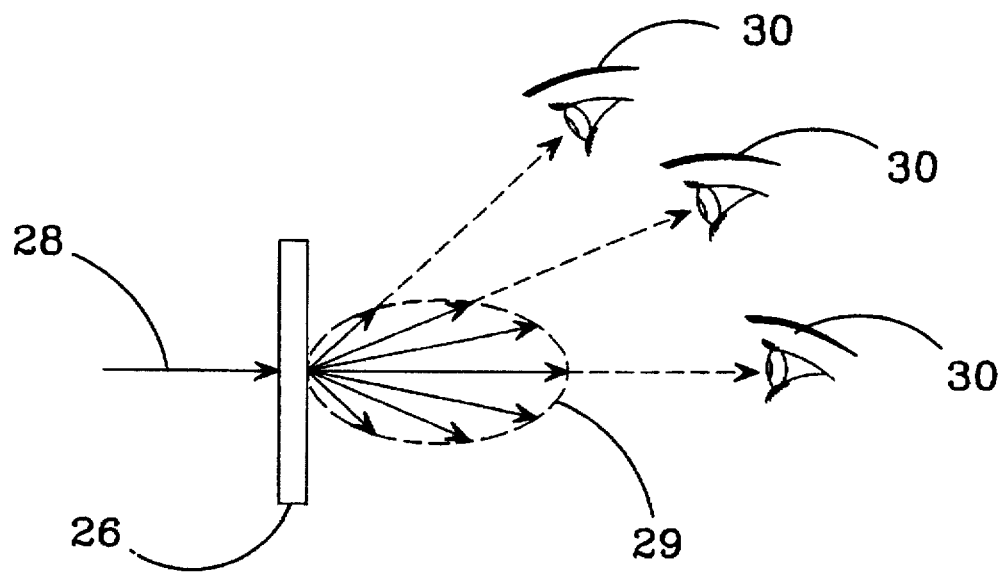
FIG. 2a is a block diagram illustrating the diffusion properties of a typical diffusing screen.
Figure 2B:
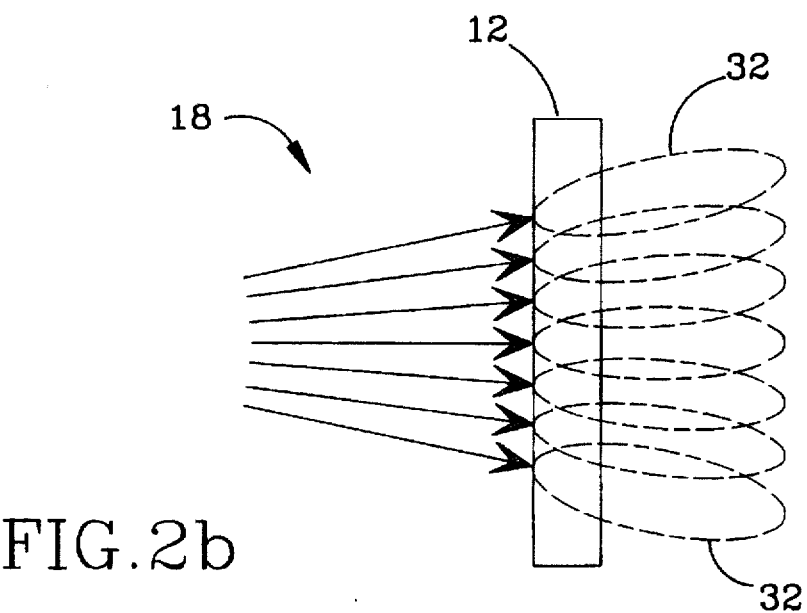
FIG. 2b is a block diagram illustrating the diffusion properties of a rear projection screen constructed in accordance with the present invention.

The present rear projection screen 8 achieves uniform image brightness over a larger field-of-view than could be achieved with prior rear projection screens. The reason for this is illustrated in FIGS. 2a and 2b. FIG. 2a illustrates the effect of a typical diffusion screen 26 on a light ray 28. If the diffusing screen 26 were a perfect light diffuser (a Lambertian diffuser) it would scatter the light ray 28 equally in all directions, and an observer 30 would observe uniform brightness from all angles. In practice, diffusing screens 26 are not Lambertian diffusers. They scatter the light ray over a diffusion lobe 29, so that an observer 30 looking at an area on the screen 26 would observe that the brightness decreases as he moves from a central viewing position to a side viewing position. The image brightness is a function of the angle between the direction of propagation of the incident light ray 28 and the direction of observation.

In the present invention, each point on the image is scattered into a set of scattered light rays by the first diffusing assembly. As illustrated in FIG. 2b, each ray in the scattered light ray set 18 is scattered again by the second diffusing assembly 12, and produces a respective diffusion lobe 32. The lobes 32 overlap to give a more uniform average brightness over a larger field-of-view than prior rear projection screens.

Figure 3:
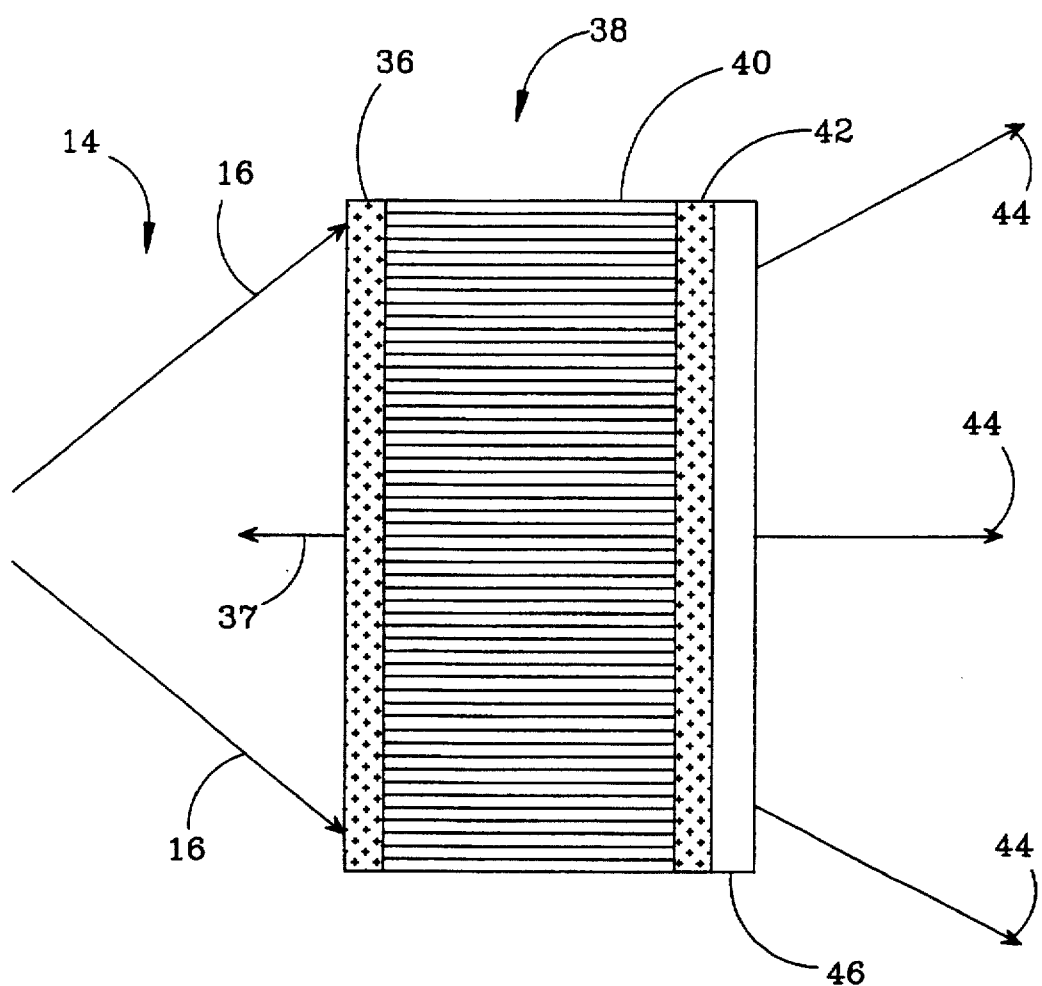
FIG. 3 is a simplified sectional view illustrating a preferred embodiment of the invention.

FIG. 3 illustrates a preferred embodiment of the invention. An input diffusing screen 36 is attached to one end of a fiber optic array 38, preferably with optical cement (not shown). The input diffusion screen 36 scatters each image light ray 16 in the incoming image light 14 into a set of scattered light rays. Features of the input diffusing screen 36 are set forth in detail in United States patent application Ser. No. 08/071,126, filed Jun. 2, 1993 (attorney's docket number PD-92614). The details of this application are incorporated herein by this reference as though fully set forth. Briefly, the diffusing screen 36 is preferably formed of a plastic matrix material in which a number of diffusing particles, such as microspheres, are embedded.

The scattered light rays collectively form a diffusion lobe pattern that is centered on the angle of incidence that the image light ray 16 makes with respect to the diffusion screen axis 37. Some of the scattered rays in each set are collected by the fiber optic array 38 and transmitted to an output diffusing screen 42. The fiber optic array 38 is an array of optical fibers 40 that are preferably less than 2.5 cm in length and that are fused together to form a glass plate. Further details of the fiber optic array are set forth in related U.S. patent application Ser. No. 08/319,342. The details of this application are incorporated herein by this reference as though fully set forth.

The fibers 40 in the fiber plate 38 capture the scattered light rays that fall within the fibers' acceptance angle. The fiber acceptance angle is determined by the numerical aperture of the fibers 40, which is preferably less than approximately 0.50. These captured rays undergo multiple reflections inside the fibers 40 and are transmitted to the output diffusing screen 42. Each captured light ray is reflected a different number of times inside the fiber optic array 38, so that it exits the fiber array with propagation directions that are substantially randomized.

Figure 4:
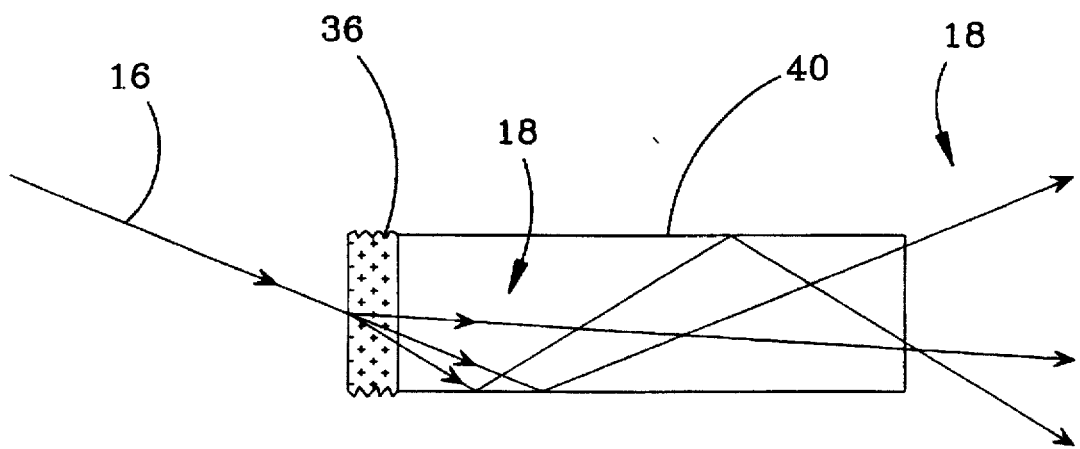
FIG. 4 is a magnified cross-sectional view of an optical fiber that is used in the embodiment of FIG. 3.

This effect is illustrated in FIG. 4, which is a magnified view of one of the fibers 40 in the array 38. Each image light ray 16 is scattered into a set of multiple light rays 18 by the input diffusing screen 36. The scattered light rays 18 undergo different numbers of bounces inside the fiber 40 and exit with substantially random propagation directions. This effect is repeated for all of the light rays 16 in the incoming image.

Referring back to FIG. 3, the light rays that exit the fiber array 38 are diffused by the output diffusion screen 42, and their respective diffusion lobes overlap to produce a final image 44 with a more substantially uniform brightness value over a larger field-of-view than prior rear projection screens. In the preferred embodiment, an anti-reflection coating 46 is applied to the output diffusion screen 42 to reduce glare from ambient light.

Although the preferred embodiment comprises two diffusing screens 36 and 42 and a fiber optic array 38, the invention may be practiced with two spaced diffusing screens and no fiber optic array, or with an input diffusing screen and a fiber optic array (with no output diffusing screen). Additional diffusing screens may also be used in at either the input or output side of the projection screen 48 to further improve the brightness uniformity of the image 50.

Figure 5:
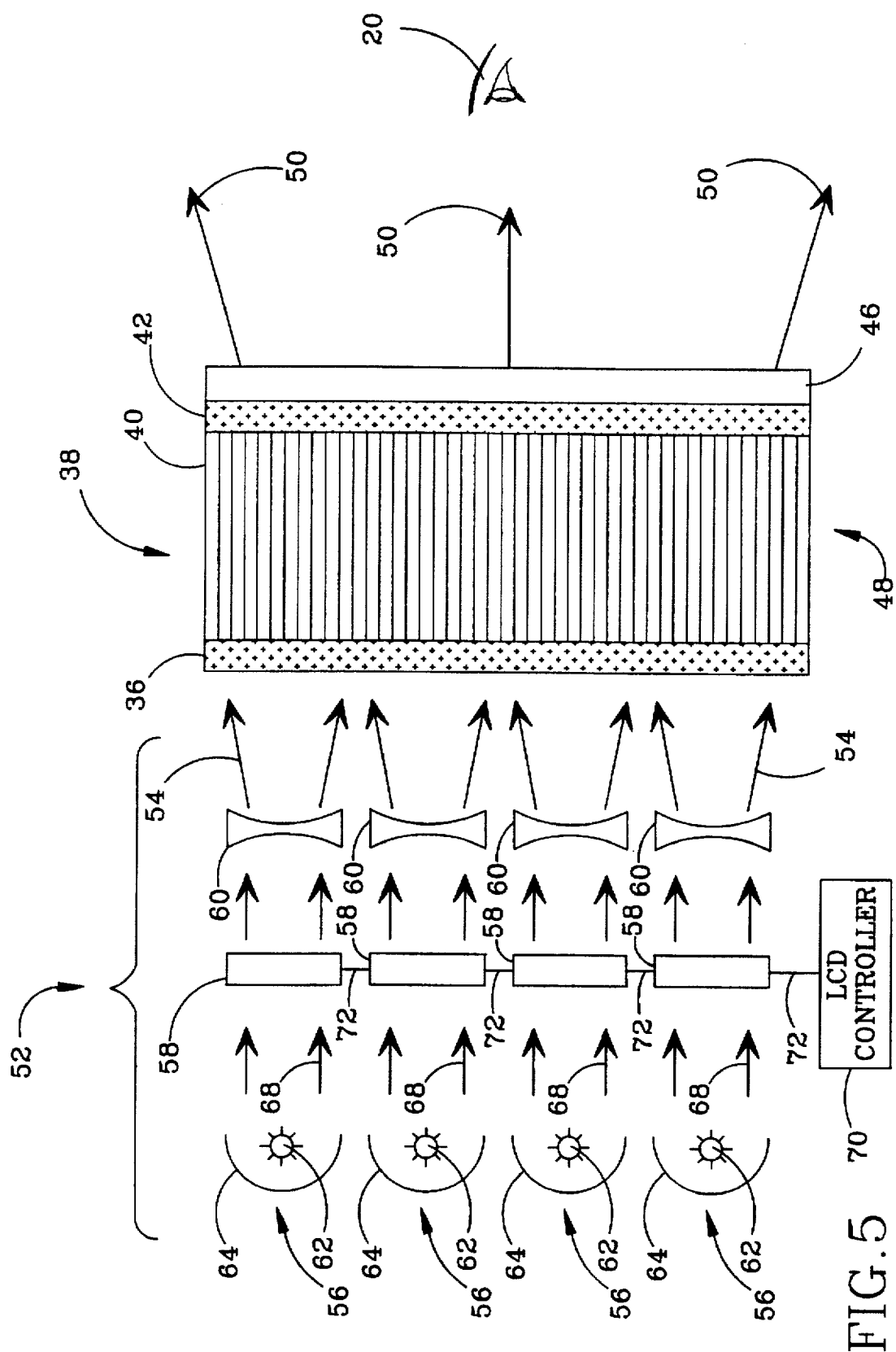
FIG. 5 is a simplified and partially sectioned elevation view illustrating a tiled optical projection system that incorporates the present invention.

FIG. 5 illustrates a tiled optical projection system that utilizes the present rear projection screen 48. An image is projected onto the screen 48 using multiple image sources 52, with each image source 52 projecting a portion 54 of the overall image. The individual image portions 54 are projected onto the rear projection screen 48 in a tiled fashion so that, when the screen 48 is viewed by an observer 20, the individual image portions 54 combine to form an overall image 50.

In the preferred embodiment, each image source 52 comprises a collimated light source 56, an active matrix transmissive liquid crystal display (LCD) assembly 58 and an imager 60. Active-matrix transmissive LCLVs are well known in the art. For a detailed description of these devices see B. Bahadur, *Liquid Crystals: Applications and Uses*, vol. 1, World Scientific Publishing (1990), pages 397-436. A simplified collimated light source 56 is preferably used, comprising a light source 62 such as a metal halide lamp or Xenon arc lamp and a parabolic/elliptical reflector 64.

The operation of one of the image sources 52 will now be described. The parabolic/elliptical reflector 64 directs light from the light source 62 in a direction substantially perpendicular to the surface of rear projection display 48, thereby collimating the light. The collimated light 68 is directed to the LCD assembly 58, which imparts an image portion onto it in response to image signals from an LCD controller 70 that are sent to the LCD assemblies 58 through signal line 72. The LCD assembly 58 is preferably an active matrix liquid crystal light valve. The image portion 54 from the LCD assembly 58 is imaged onto the input diffusing screen 36 with the imager 60, preferably a lens that is chosen so that the image portion size at the input diffusing screen 36 is larger than the LCD assembly size. This allows the image portions 54 to be "butted" together at the input diffusing screen 36.

The operation of the rear projection screen 48 is the same as described above. Because the present rear projection screen 48 has a larger field-of-view than prior projections screens, the final image 50 appears approximately uniformly bright to an observer 20 looking in a direction normal to the output diffuser 42 (on-axis viewing). Image brightness uniformity is also improved for off-axis viewing.

The diameter of the collimated light beam 68 and the focal length of the reflector 64 dictates how far the light source 62 must be from the reflector 64, which in turn dictates the thickness of the overall display. The smallest distance that can be achieved between the light source 62 and the reflector 64 (with an f1 reflector) is equal to the diameter of the collimated light beam 68. By using multiple small LCD assemblies 58, one can use collimated beams 68 with smaller diameters, which reduces the distance between the reflector 64 and the light source 62. This feature is particularly useful in flat panel display applications, in which the thickness of the display must be minimized.

Numerous other variations and alternate embodiments will occur to those skilled in the art without departing from the spirit and scope of the invention. For example, the diffusing assemblies that comprise the rear projections screen could be implemented with only two spaced diffusing screens, or with an input diffusing screen and a fiber array, without the use of an output diffusing screen. Additional diffusing screens may also be used to further improve the brightness uniformity of the final image. Such variations and alternate embodiments are contemplated, and can be made without departing from the spirit and scope of the appended claims.

We claim:

1. A projection screen for displaying an image from an image source, comprising:
    a first diffusing assembly comprising an input diffusing screen for diffusing said image, and
    a second diffusing assembly comprising a fiber optic array positioned to receive an image from said input diffusing screen and to further diffuse said image.

2. The projections screen of claim 1, further comprising an output diffusing screen positioned at an output end of said fiber optic array, for diffusing said image a third time.

3. A projection screen for displaying an image from an image source, comprising:
    an input diffusing screen having input and output sides, for diffusing said image, and
    a fiber optic array having an input end that is attached to the output side of said input diffusing screen, for receiving and further diffusing said diffused image.

4. The projection screen of claim 3, further comprising an output diffusing screen attached to said output end of said fiber optic array, for diffusing said image a third time after it exits said fiber optic array.

5. The projection screen of claim 4, further comprising an anti-reflection coating on a viewing side of said output diffusing screen.

6. The projection screen of claim 3, wherein each of said input and output diffusing screens comprises a plastic matrix embedded with diffusion particles.

7. The projection screen of claim 3, wherein said fiber optic array comprises an array of optical fibers having a numerical aperture not greater than approximately 0.50.

8. An optical projection system for displaying an image, comprising:
    a first diffusing assembly,
    a plurality of image sources for generating respective portions of said image and directing said portions to said first diffusing assembly, so that said image portions are adjacent to each other at said first diffusing assembly, and are diffused by said first diffusing assembly, and
    a second diffusing assembly for further diffusing said diffused image portions.

9. The projection screen of claim 8, wherein said first and second diffusing assemblies comprise first and second diffusing screens.

10. The projection screen of claim 8, wherein said first and second diffusing assemblies respectively comprise:
    an input diffusing screen for diffusing said image portions, and
    a fiber optic array attached to an output side of said input diffusing screen for receiving and further diffusing said diffused image portions.

11. The projection screen of claim 10, further comprising an output diffusing screen positioned at an output end of said fiber optic array, for diffusing said image portions a third time.

12. The projection system of claim 11, further comprising an anti-reflection coating on a viewing side of said output diffusing screen.

13. The projection system of claim 11, wherein each of said first and second diffusing screens comprises a plastic matrix with embedded diffusion particles.

14. The projection system of claim 9, wherein said fiber optic array comprises optical fibers having a numerical aperture not greater approximately 0.50.

15. The projection system of claim 8, wherein said image sources comprise:
    a plurality of collimated light sources for generating a plurality of collimated light beams,
    respective liquid crystal display assemblies for imparting said image portions onto said collimated light beams, and
    respective imagers for imaging said image portions onto said first diffusing assembly.

16. The projection system of claim 15, wherein said imagers comprise respective lenses.

* * * * *

UNITED STATES PATENT AND TRADEMARK OFFICE
CERTIFICATE OF CORRECTION

PATENT NO. : 5,626,410

DATED : May 6, 1997

INVENTOR(S) : James M. Chambers et al.

It is certified that error appears in the above-indentified patent and that said Letters Patent is hereby corrected as shown below:

Column 1, line 9: delete "Hughes Aircraft Company" and insert --Palomar Technologies Corporation--.

Column 1, line 50: delete "at a".

Column 6, Claim 14, line 43: after "greater" insert --than--.

Signed and Sealed this

Twelfth Day of August, 1997

Attest:

BRUCE LEHMAN

*Attesting Officer*   *Commissioner of Patents and Trademarks*